United States Patent
Quella et al.

(10) Patent No.: US 8,968,848 B2
(45) Date of Patent: Mar. 3, 2015

(54) INDUCTION HEATING SYSTEM

(75) Inventors: John Quella, Sturgeon Bay, WI (US);
Allan Witt, Lenoir, NC (US)

(73) Assignee: Hatco Corporation, Milwaukee, WI (US)

( * ) Notice: Subject to any disclaimer, the term of this patent is extended or adjusted under 35 U.S.C. 154(b) by 0 days.

(21) Appl. No.: 13/396,421

(22) Filed: Feb. 14, 2012

(65) Prior Publication Data

US 2012/0138597 A1    Jun. 7, 2012

Related U.S. Application Data

(63) Continuation of application No. 11/257,512, filed on Oct. 25, 2005, now Pat. No. 8,124,200.

(51) Int. Cl.
| | | |
|---|---|---|
| *B32B 1/02* | (2006.01) | |
| *B32B 15/08* | (2006.01) | |
| *A47J 36/24* | (2006.01) | |
| *B32B 15/12* | (2006.01) | |
| *B32B 27/10* | (2006.01) | |
| *B32B 29/00* | (2006.01) | |
| *H01Q 1/22* | (2006.01) | |
| *H01Q 1/44* | (2006.01) | |
| *B32B 1/08* | (2006.01) | |

(52) U.S. Cl.
CPC ............... *B32B 15/08* (2013.01); *A47J 36/24* (2013.01); *B32B 15/12* (2013.01); *B32B 27/10* (2013.01); *B32B 29/005* (2013.01); *H01Q 1/2225* (2013.01); *H01Q 1/44* (2013.01); *B32B 2250/03* (2013.01); *B32B 2255/12* (2013.01); *B32B 2255/205* (2013.01); *B32B 2307/202* (2013.01); *B32B 2439/70* (2013.01); *B32B 2519/02* (2013.01)

USPC ........ 428/34.2; 428/34.1; 428/35.7; 428/35.9; 428/36.9

(58) Field of Classification Search
USPC ...................... 428/34.1, 34.2, 35.7, 35.9, 36.9
See application file for complete search history.

(56) References Cited

U.S. PATENT DOCUMENTS

| | | | |
|---|---|---|---|
| 3,294,946 A | 12/1966 | Baermann | |
| 3,715,550 A * | 2/1973 | Harnden et al. | ............... 219/622 |
| 4,020,310 A | 4/1977 | Souder et al. | |
| 4,110,587 A | 8/1978 | Souder et al. | |
| 4,614,852 A | 9/1986 | Matsushita et al. | |
| 4,776,386 A | 10/1988 | Meier | |

(Continued)

FOREIGN PATENT DOCUMENTS

| | | |
|---|---|---|
| GB | 2 308 947 | 7/1997 |
| JP | 6-18044 | * 1/1994 |

OTHER PUBLICATIONS

"Bleacher Heaters, New Income from an Old Game," see IDS for date information, 1 page, Thermal Solutions, Inc, 2005.

(Continued)

*Primary Examiner* — Marc Patterson
(74) *Attorney, Agent, or Firm* — Foley & Lardner LLP

(57) ABSTRACT

An induction heating system includes a first heating surface and an induction coil located adjacent the first heating surface. The induction heating system also includes food packaging configured to be placed on the first heating surface. The food packaging contains a current conducting material such that the food packaging is inductively heated to a temperature sufficient to heat food when the induction coil is energized.

12 Claims, 2 Drawing Sheets

(56) References Cited

U.S. PATENT DOCUMENTS

| | | | |
|---|---|---|---|
| 5,343,024 A * | 8/1994 | Prosise et al. | 219/730 |
| 5,466,915 A | 11/1995 | Meier et al. | |
| 5,548,101 A * | 8/1996 | Lee | 219/601 |
| 5,611,328 A | 3/1997 | McDermott | |
| 5,853,632 A | 12/1998 | Bunke et al. | |
| 5,919,391 A * | 7/1999 | Jun | 219/746 |
| 5,992,411 A | 11/1999 | Ayot et al. | |
| 6,072,169 A * | 6/2000 | Kang et al. | 219/702 |
| 6,097,014 A | 8/2000 | Kirsch | |
| 6,191,401 B1 | 2/2001 | Salerno et al. | |
| 6,232,585 B1 * | 5/2001 | Clothier et al. | 219/620 |
| 6,320,169 B1 | 11/2001 | Clothier | |
| 6,350,972 B1 * | 2/2002 | Wright et al. | 219/621 |
| 6,504,135 B2 | 1/2003 | Clothier et al. | |
| 6,512,211 B1 | 1/2003 | Lockhart et al. | |
| 6,555,789 B2 * | 4/2003 | Owens et al. | 219/387 |
| 6,566,634 B2 | 5/2003 | Boyd et al. | |
| 6,630,650 B2 * | 10/2003 | Bassill et al. | 219/626 |
| 6,770,400 B2 | 8/2004 | Tsutsumi et al. | |
| 6,774,346 B2 | 8/2004 | Clothier | |
| 6,953,919 B2 | 10/2005 | Clothier | |
| 7,157,675 B2 * | 1/2007 | Imura | 219/627 |
| 2001/0046554 A1 * | 11/2001 | Boyee et al. | 427/116 |
| 2002/0008102 A1 | 1/2002 | Boyd et al. | |
| 2002/0079121 A1 | 6/2002 | Ryan et al. | |
| 2002/0108948 A1 * | 8/2002 | Clothier et al. | 219/627 |
| 2002/0134831 A1 | 9/2002 | Saveliev et al. | |
| 2004/0144773 A1 * | 7/2004 | Kim et al. | 219/601 |

OTHER PUBLICATIONS

"CamWarmer Food Transport Heater by Cambro With Technology Licensed by Thermal Solutions," see IDS for date information, 1 page, Thermal Solutions, Inc, 2005.

"Camwarmer," see IDS for date information, 1 page, Cambro Manufacturing Company, Huntington Beach, CA, 2005.

"Coffee Concepts, a New Solution to the Same Old Grind," see IDS for date information, 1 page, Thermal Solutions, Inc, 2005.

"Conventional Restaurant Stir Fry (Cross-Section), Thermal Solutions Induction-Heated Wok (Cross-Section)," see IDS for date information, 1 page, 2005.

"Flashpack Delivery Systems by CookTek With Technology Licensed by Thermal Solutions," see IDS for date information, 1 page, Thermal Solutions, Inc, 2005.

"Hot Plates and Covers, Plates and Tops for the Bottom Line," see IDS for date information, 1 page, Thermal Solutions, Inc, 2005.

"Hot Solutions, Cool Technology," see IDS for date information, 1 page, Thermal Solutions, Inc, 2005.

"Improved Silicone-Covered Discs, The Heart of the New Heat," see IDS for date information, 1 page, Thermal Solutions, Inc, 2005.

"RFID—Radio Frequency Identification," see IDS for date information, 1 page, Thermal Solutions, Inc, 2005.

"Smart Rangetops, Thinking Like a Chef," see IDS for date information, 1 page, Thermal Solutions, Inc, 2005.

"Souper Tureen, No More Watched Pots," see IDS for date information, 1 page, Thermal Solutions, Inc, 2005.

"Steak-n-Fajita Platter, With Technology Licensed by Thermal Solutions," see IDS for date information, 1 page, Thermal Solutions, Inc, 2005.

"What We Do," see IDS for date information, 1 page, Thermal Solutions, Inc, 2005.

"What's Next?" see IDS for date information, 1 page, Thermal Solutions, Inc, 2005.

"Who We Are, Inspiration and fate join in a Product Revolution," 2005, 1 page, Thermal Solutions, Inc.

Babyak, Richard, "Automatic Cooktop," Appliance Design, Feb. 1, 2002, 4 pages, BNP Media, 2005.

Magnetic Ind & RFID, "How We Use Magnetic Induction Heating, Heat That's Cool," see IDS for date information, 2 pages, Thermal Solutions, Inc, 2005.

Products & Licensing, "Thermal Solutions—Your Development Partner, The Hottest Smart Products, The Coolest Applications," see IDS for date information, 2 pages, Thermal Solutions, Inc, 2005.

\* cited by examiner

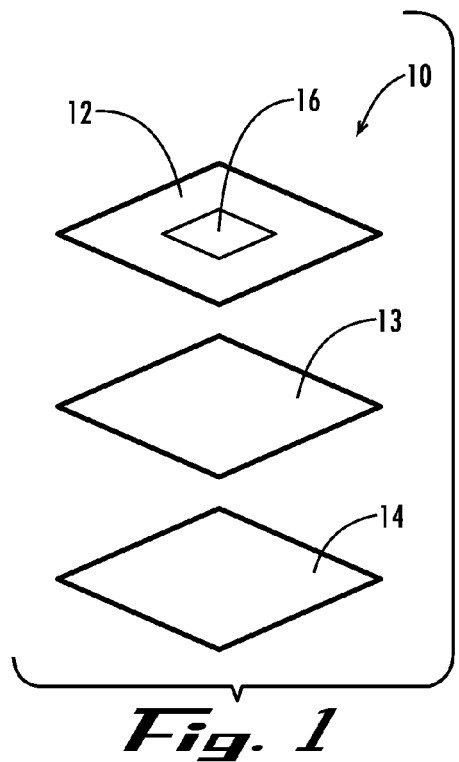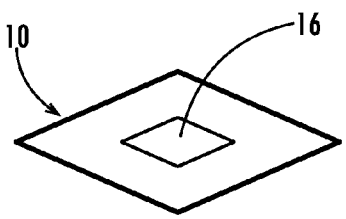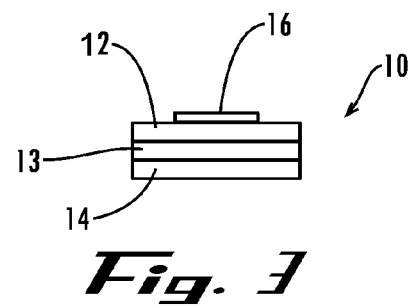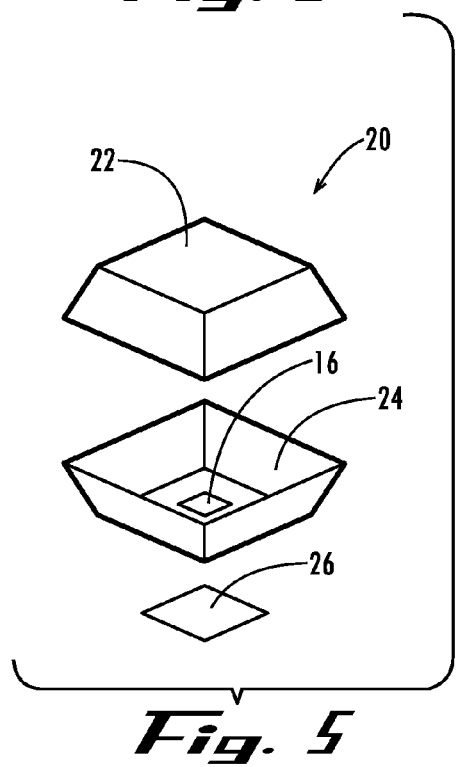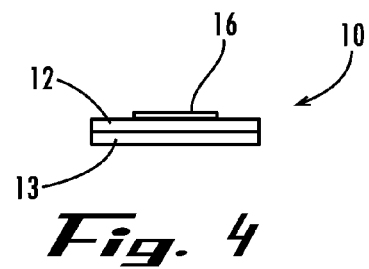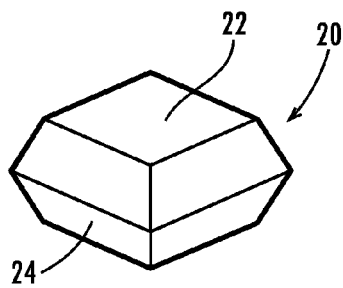

INDUCTION HEATING SYSTEM

CROSS-REFERENCE TO RELATED PATENT APPLICATIONS

The present application is a continuation of U.S. patent application Ser. No. 11/257,512, filed Oct. 25, 2005, which is incorporated herein by reference in its entirety.

BACKGROUND

Many restaurants, and especially fast food restaurants, prepare food in advance so that they can meet the daily fluctuations in demand that occur around breakfast time, lunch time, or dinner time. Food prepared in advance must be stored safely until it is delivered to the consumer. For many food products this means keeping the food product above a certain minimum threshold temperature to prevent spoilage. For other food products, it means keeping the food frozen or chilled. Either way, the food products need to be heated and held at an elevated temperature before being served to consumers.

Although many systems exist to warm or heat food, many of these suffer from a number of drawbacks. For example, infrared (IR) heat lamps not only heat the food, but they also heat the surrounding environment. This can result in increased air conditioning costs for the restaurant. This problem may be exacerbated when the food products are in metal foil packaging since the metal foil may have a tendency to reflect the IR radiation away from the food product and into the surrounding environment. Furthermore, IR lamps tend to become quite hot, which poses a burn risk to restaurant employees and/or customers. Although warm air convection systems do not have many of the problems associated with IR lamps, warm air convection systems often cause food products to dry out. Both IR and warm air convection systems tend to steadily consume power regardless of how many food products are currently being heated.

It would be desirable to provide an improved system for warming food that is energy efficient, safe, and effective. In one embodiment described herein, an induction heating system is used to warm food. The food may be packaged in food packaging that includes a current conducting material. The food packaging may be capable of being inductively heated to a temperature sufficient to warm the food.

DRAWINGS

FIG. 2 shows an assembled view of the wrapper from FIG. 1.

FIG. 3 shows a side view of the embodiment of the wrapper from FIG. 1.

FIG. 4 shows a side view of another embodiment of a wrapper which may be used to package food.

FIG. 5 shows an exploded perspective view of one embodiment of box which may be used to package food.

FIG. 6 shows a perspective view of the box from FIG. 4 assembled for use.

FIG. 7 shows a perspective view of an induction heating system which may be used to heat the food packaging shown in FIGS. 1-5.

DETAILED DESCRIPTION

Figure 1:
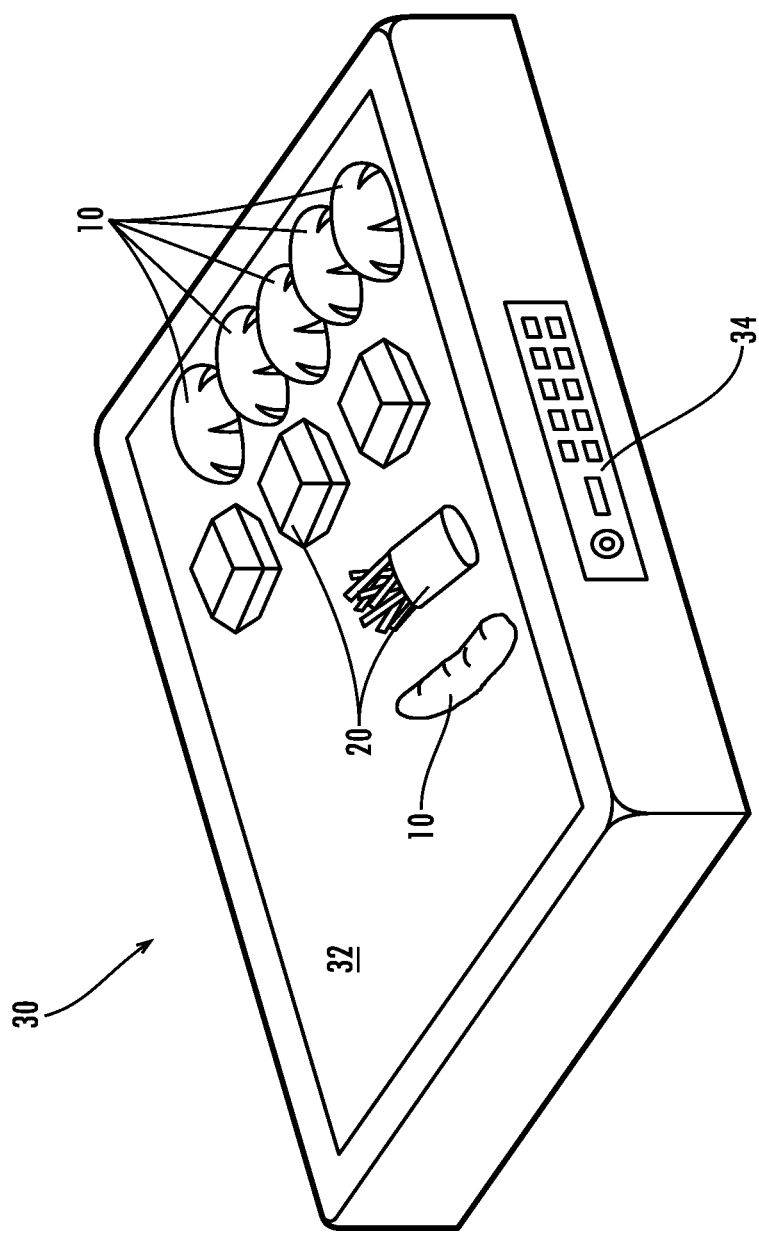
FIG. 1 shows an exploded perspective view of one embodiment of a wrapper which may be used to package food.

Food packaging and systems which are used to heat food packaging are described herein. In general, the systems may be used to heat food products by inductively heating the food packaging which, in turn, heats the adjacent food product(s). Induction heating uses electromagnetic energy to heat current conducting materials. This is done using an induction coil which produces an alternating magnetic field when activated. When a current conducting material is placed in the alternating magnetic field, the magnetic field induces eddy currents in the current conducting material. The eddy currents generate precise amounts of localized heat without any physical contact between the induction coil and the current conducting material. Magnetic materials are often easier to heat than non-magnetic materials due to the effects of hysteresis heating. Magnetic materials naturally resist the rapidly changing magnetic fields within the induction coil. The resulting friction produces its own additional heat—hysteresis heating—in addition to eddy current heating. Magnetic materials can become difficult to heat above their "Curie" point, which is the temperature where magnetic materials lose their magnetic properties.

The use of an induction heating system may provide a number of advantages. For example, unlike conventional gas and heat, no heat is generated until the current conducting material is placed in the magnetic field. Also, the magnetic field only heats the current conducting material and not the surrounding materials. There is not a hot cooktop surface that may pose a burn risk to nearby persons. Induction heating systems also tend to be highly energy efficient because a very large percentage of the energy is going directly into the current conducting material. Furthermore, induction heating tends to heat items faster than gas and when power is cut off, heating ceases immediately. This allows for precise control of the heating of the current conducting material. It should be understood that throughout this disclosure, the features, advantages, characteristics, etc. of one embodiment may be applied to any other embodiment to form an additional embodiment, unless noted otherwise.

Referring to FIG. 1, an exploded view of one embodiment of food packaging is shown as a wrapper 10. The wrapper 10 includes a first layer 12, a second layer 13, and a third layer 14 (collectively referred to herein as layers 12-14). The wrapper may optionally include a radio frequency (RF) tag 16. The layers 12-14 when combined form the wrapper 10, as shown in FIG. 2.

The wrapper 10 may be used to package any of a number of food products. For example, typical food products that may be packaged with the wrapper 10 include sandwiches such as hamburgers, subs (typically hot subs), and the like; platters (e.g., food prepared and placed on a plate, etc.), wraps (e.g., tortilla wraps and the like), and so on. It should be appreciated that the wrapper 10 may be used to package virtually any food product that is intended to be heated.

The wrapper 10 is designed to be pliable to allow it to be wrapped around the food product. Also, the wrapper 10 typically is not very resilient in that the wrapper 10 tends not to move back to a previous position after it has been wrapped around a food product. It should also be appreciated that although the wrapper 10 shown in FIG. 1 is square, the wrapper 10 may take any of a number of shapes such as rectangular, triangular, and so forth.

The first layer 12 and the third layer 14 may be made from a number of suitable materials. For example, in one embodiment, the first layer 12 and/or the third layer 14 may include a cellulose based material such as paper or cellophane. In another embodiment, the first layer 12 and/or the third layer 14 may include a polymeric material.

The second layer 13 may include a current conducting material such as a ferrous material, alloy, other current conducting materials, or combinations thereof. In general, the current conducting material is selected based on factors such as cost, what type of food product is being heated, etc.

Although the second layer 13 is shown in FIG. 1 as having the same surface area as the first layer 12 and third layer 14, the second layer 13 may be localized so that when the food product is wrapped in the wrapper, the current conducting material in the second layer 13 is only positioned beneath the food product and not on the portion of the wrapper that wraps the side and top of the food product. This may be desirable to minimize cost, reduce energy consumption, etc. In addition, the layers 12-14 are shown in FIG. 3 as being approximately the same thickness. However, it should be appreciated that the thickness of each of the layers 12-14 may each be different.

In one embodiment, the second layer 13 may be a distinct layer that comprises primarily the current conducting material. For example, the second layer 13 may be in the form of a coating of the current conducting material applied to the first layer 12 or third layer 14. Also, the second layer 13 may be a sheet of a current conducting material that is sandwiched in between the first layer 12 and the third layer 14. It should be appreciated that other methods may also be used to provide a distinct layer that is primarily or substantially entirely made up of the current conducting material.

In another embodiment, the current conducting material in the second layer 13 may be impregnated in another substrate such as a cellulose based material. It should be appreciated that any of a number of suitable substrate materials may be used as the substrate.

The thickness of the second layer 13 may also vary widely. For example, the second layer 13 may be no more than approximately 30 mils thick, no more than approximately 15 mils thick, or, desirably, no more than approximately 8 mils thick. In other embodiments, the thickness of the second layer 13 may be approximately 1 mil to 8 mils, approximately 1 mil to 5 mils, or, desirably, approximately 3 mils.

The number and configuration of the layers used to form the wrapper 10 may be varied. For example, as shown in FIG. 4, the wrapper 10 may include only the first layer 12 and the second layer 13. Also, the wrapper 10 may include a single layer that is impregnated with the current conducting material. In other embodiments, the wrapper 10 may include four or more layers (e.g., wrapper 10 may include an insulation layer, protective coating material, etc.). Moreover, the thickness of the wrapper 10 may also vary. For example, the wrapper 10 may be no more than approximately 250 mils thick, no more than approximately 125 mils thick, or, desirably, no more than 62 mils thick. It should be appreciated that the size of the wrapper 10 may vary widely depending on the particular food product used with the wrapper 10.

As shown in FIGS. 1-4, an optional RF tag 16 may also be included with the wrapper 10. It should be appreciated that although FIGS. 1-4 show the RF tag 16 attached to the first layer 12 of the wrapper 10, the RF tag 16 may be coupled to or included with the wrapper 10 in any of a number of ways and configurations. For example, the RF tag 16 may be positioned between the first layer 12 and the second layer 13, or the RF tag 16 may be positioned between the second layer 13 and the third layer 14.

It should be noted that for purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

The RF tag 16 may be configured in a number of different ways depending on the particular application. For example, in one embodiment, the RF tag 16 may be an RFID tag that is configured to transmit information to a reader device. The information may include information about the food product, information related to the wrapper 10, information used to control heating of the food product (heating algorithms for a particular food product that cycle the induction coil on and off according to a regular pattern, etc.), etc.

In operation, the RF tag 16 is positioned close enough to the reader device to receive a signal from the reader device. The signal wakes-up the RF tag 16 and provides the energy that allows the RF tag 16 to provide the information to the reader device or another nearby device. Typically, the RF tag 16 stores the information in read-only memory. However, it should be appreciated that the RF tag 16 may store the information in programmable memory as well. The reader device may be capable of sending information to the RF tag 16 that can be stored in the programmable memory. Suitable RF tags 16 may be obtained from Redprairie Corp., Waukesha, Wis. 53186 or Appleton Papers, Inc., 825 E. Wisconsin Ave., Appleton, Wis. 54912.

In one embodiment, the RF tag 16 may include a temperature sensor such as a thermal switch. The thermal switch may be configured to prevent communication from the RF tag 16 to the reader device once the RF tag 16 reaches a preset temperature. In this manner, the RF tag 16 may be used to provide feedback to a controller in order to prevent the food item from becoming too hot. In this embodiment, the RF tag 16 may be positioned on the wrapper 10 so that the RF tag 16 is close enough to the food product to effectively reflect the temperature of the food product as it is heated.

Referring to FIGS. 5-6, an exploded view and an assembled view, respectively, are shown of another embodiment of food packaging that is capable of being heated inductively. In this embodiment, the food packaging may be referred to as a container or box 20. The container 20 includes a lid or top 22 and a base or bottom 24 that are sized to fit together to enclose a food product. The container 20 may optionally include the RF tag 16. It should be appreciated that the particular design of the container 20 may vary widely. For example, the container 20 may be configured to hold a food product without enclosing the food product (e.g., rigid french fries container, etc.).

The container 20 may be rigid and sized to hold one or more food products such as a hamburger sandwich, chicken nuggets, hash browns, etc. Virtually any food product that can be heated can be held in the container 20. It should be appreciated that the shape of the container 20 can also vary widely to accommodate a wide variety of food products.

In the embodiment shown in FIGS. 5-6, the lid 22 and the base 24 of the container 20 are separate pieces. However, in other embodiments, the lid 22 and the base 24 may be a single integral piece. For example, the lid 22 may be pivotally coupled to the base 24 to form a container that opens and closes like a clamshell.

The container 20 may be made out of any of a number of suitable materials. In one embodiment, the container 20 may include a cellulose based material such as a lightweight cardboard or rigid paper. The thickness of the walls of the container 20 may vary widely. For example, the thickness of the walls may be no more than approximately 250 mils thick, no more than approximately 125 mils thick, or, desirably, no more than 62 mils thick.

As shown in FIG. 5, the container 20 includes a layer 26 that is capable of conducting a current. It should be appreciated that most, if not all, of the various ways that the current conducting material can be included in the wrapper 10 also apply to the container 20. For example, the layer 26 may include a current conducting material such as any of those mentioned in connection with the wrapper 10. The layer 26 may include a substrate such as a cellulose based material that is impregnated with the current conducting material, or the layer 26 may be substantially entirely made of a current conducting material. The layer 26 may be applied to the underside or topside of the base 24 as a coating. Also, the base 24 of the container 20 may be a single layer of material that is impregnated with the current conducting material. Numerous other configurations are also possible.

The current conducting material may be localized in the container 20 to maximize the amount of heat that is transferred to the food product and minimize the cost associated with providing the current conducting material. For example, the current conducting material may be provided only in a small area at the bottom of the base 24 of the container 20. Also, the layer 26 that includes the current conducting material may have the same thickness as the layer 13 in the wrapper 10.

The container 20 may also include the RF tag 16. The RF tag 16 may operate as previously described in connection with the wrapper 10. Although the RF tag 16 is shown as being positioned at the bottom of the base 24 of the container 20, it should be appreciated that the RF tag 16 may be positioned in any other suitable location on or in the container 20.

Referring to FIG. 7, an induction heating system 30 is shown that can be used to heat food products packaged in the wrappers 10 and the containers 20. The induction heating system 30 includes a surface 32, at least one induction coil, which is typically positioned underneath the surface 32, and an electronic control unit 34. The food products may be heated by positioning the packaged food products on the surface 32 of the induction heating system 30. When the induction coil is energized, the current conducting material in the wrappers 10 and containers 20 begins to heat up. The heat from the current conducting material is transferred to the respective food product, thereby heating the food product.

It should be appreciated that the induction heating system 30 may vary from the configuration shown in FIG. 7 in a number of ways. For example, the induction heating system 30 may include more than one surface 32. The induction heating system 30 may include two, three, four, ten, fifteen, twenty, or more surfaces 32 built into a single unit. In those embodiments that use two or more surfaces 32 positioned one above the other, the induction coil included with each surface may be capable of heating the food packaging from the top and the bottom. The food packaging may include localized amounts of the current conducting material in the top and the bottom of the food packaging. Numerous other embodiments may also be used.

In one embodiment, the induction heating system 30 may include multiple induction coils so that the surface 32 may be zoned into separate areas where different food products can be heated. As shown in FIG. 7, the surface 32 may include a zone for hamburger sandwiches wrapped in the wrappers 10, a zone for chicken sandwiches positioned in the containers 20, a zone for french fries positioned in the container 20, and another zone for hot deli sandwiches wrapped in the wrapper 10.

The electronic control unit 34 may be used to control heating of the food products. For example, in one embodiment, the electronic control unit 34 may include a plurality of programs which are specific to a number of different food products. When a packaged food product is placed on the surface 32, the operator can input the program that controls heating of the food product into the electronic control unit 34. In another embodiment, the induction coil for each respective zone may be configured to cycle on and off at a rate that is sufficient to maintain a particular food product at a safe temperature. A current sensor or other sensor may be provided to determine how much energy is being used by the inductive coil and thereby estimate the amount of food products positioned on that zone of the surface 32. In this manner, the electronic control unit 34 can automatically adjust the cycle to account for changes in the number of food products in the zone.

In those situations where the RF tag 16 is included with the food packaging, the RF tag 16 may be used to automatically provide the electronic control unit 34 with information such as the type of food product, heating instructions, etc. Also, the RF tag 16 allows the electronic control unit to know exactly how many food products are in a given zone at a given time. Furthermore, if the RF tags 16 include a temperature sensor, then the electronic control unit 34 may be programmed to turn off the inductive coil when the RF tag 16 indicates that a preset temperature has been reached. In this manner, the electronic control unit 34 can control heating of the food products using feedback control.

Illustrative Embodiments

Reference is made in the following to a number of illustrative embodiments of the subject matter described herein. The following embodiments illustrate only a few selected embodiments that may include the various features, characteristics, and advantages of the subject matter as presently described. Accordingly, the following embodiments should not be considered as being comprehensive of all of the possible embodiments. Also, features and characteristics of one embodiment may and should be interpreted to equally apply to other embodiments or be used in combination with any number of other features from the various embodiments to provide further additional embodiments, which may describe subject matter having a scope that varies (e.g., broader, etc.) from the particular embodiments explained below. Accordingly, any combination of any of the subject matter described herein is contemplated.

According to one embodiment, food packaging comprises: a current conducting material; wherein the food packaging is capable of being inductively heated to a temperature sufficient to heat food; and wherein the food packaging is a rigid container which includes cellulose based material and/or the food packaging is a wrapper. The current conducting material may include ferrous material. The current conducting material may form a layer that is no more than approximately 15 mils thick. The current conducting material may be impregnated in cellulose based material. The food packaging may be the wrapper. The food packaging may be the rigid container. The food packaging may comprise an RF temperature sensor.

According to another embodiment, food packaging comprises: a first layer; and a second layer of a current conducting material which is approximately 1 mil to 8 mils thick, the first layer being coupled to the second layer; wherein the food packaging is capable of being inductively heated to a temperature sufficient to heat food. The first layer may include cellulose based material. The first layer may include a polymeric material. The second layer may include ferrous material. The second layer may be approximately 1 mil to 5 mils thick. The food packaging may comprise an RF temperature sensor.

According to another embodiment, food packaging comprises: a current conducting material; and an RF temperature sensor; wherein the food packaging is capable of being inductively heated to a temperature sufficient to heat food. The current conducting material may include ferrous material. The food packaging may comprise a first layer coupled to the current conducting material, the first layer including cellulose based material. The food packaging may comprise a polymeric layer coupled to the current conducting material. The current conducting material may form a layer that is approximately 1 mil to 8 mils thick. The food packaging may be a wrapper. The food packaging may be a rigid container which includes cellulose based material.

According to another embodiment, food packaging comprises: a first layer; and a second layer of a current conducting material, the first layer being coupled to the second layer; wherein the food packaging is no more than approximately 250 mils thick; and wherein the food packaging is capable of being inductively heated to a temperature sufficient to heat food. The food packaging may be no more than approximately 125 mils thick. The food packaging may be no more than approximately 62 mils thick. The first layer may include cellulose based material. The first layer may include a polymeric material. The second layer may include ferrous material. The second layer may be approximately 1 mil to 8 mils thick. The food packaging may comprise an RF temperature sensor.

According to another embodiment, food packaging comprises: a current conducting material; wherein the food packaging is capable of being inductively heated to a temperature sufficient to heat food; and wherein the food packaging is a wrapper. The current conducting material may include a ferrous material. The food packaging may be a sandwich wrapper. The food packaging may comprise a first layer coupled to a current conducting layer, wherein the current conducting layer includes the current conducting material and is no more than approximately 15 mils thick. The first layer may comprise paper and/or a polymeric material. The food packaging may include paper. The food packaging may comprise an RF temperature sensor.

According to another embodiment, food packaging comprises: a layer of current conducting material that is approximately 1 mil to 8 mils thick; wherein the food packaging is capable of being inductively heated to a temperature sufficient to heat food; and wherein the food packaging is a rigid container. The current conducting material may include ferrous material. The current conducting material may form a layer that is approximately 1 mil to 5 mils thick. The food packaging may comprise an RF temperature sensor. The food packaging may comprise cellulose based material.

According to another embodiment, food packaging comprises: a layer of current conducting material that is no more than approximately 30 mils thick; wherein the food packaging is capable of being inductively heated to a temperature sufficient to heat food; and wherein the food packaging is a rigid container. The current conducting material may include ferrous material. The current conducting material may form a layer that is no more than approximately 15 mils thick. The current conducting material may form a layer that is approximately 1 mil to 8 mils thick. The food packaging may comprise an RF temperature sensor.

According to another embodiment, food packaging comprises: a first layer; and a second layer of a current conducting material which is no more than approximately 30 mils thick, the first layer being coupled to the second layer; wherein the food packaging is capable of being inductively heated to a temperature sufficient to heat food. The first layer may include cellulose based material. The first layer may include a polymeric material. The second layer may include ferrous material. The second layer may be no more than approximately 15 mils thick. The second layer may be approximately 1 mil to 8 mils thick. The second layer may be approximately 1 mil to 5 mils thick. The food packaging may comprise an RF temperature sensor.

According to another embodiment, food packaging comprises: a current conducting material; wherein the food packaging is capable of being inductively heated to a temperature sufficient to heat food; and wherein the food packaging opens and closes like a clamshell. The current conducting material may include ferrous material. The current conducting material may form a layer that is no more than approximately 15 mils thick. The food packaging may include cellulose based material and/or a polymeric material. The food packaging may be in the form of a rigid container. The food packaging may comprise an RF temperature sensor.

According to another embodiment, food packaging comprises: a first layer; and a second layer of a current conducting material, the first layer being coupled to the second layer; wherein the food packaging does not include a heat insulating foam material; and wherein the food packaging is capable of being inductively heated to a temperature sufficient to heat food. The first layer may include cellulose based material. The first layer may include a polymeric material. The second layer may include ferrous material. The second layer may be no more than approximately 15 mils thick. The second layer may be approximately 1 mil to 8 mils thick. The food packaging may comprise an RF temperature sensor.

According to another embodiment, a system for heating a food product comprises: an induction heating system which includes an induction coil and an electronic control unit; and a food product packaged in food packaging which includes a current conducting material, the food product being positioned in sufficient proximity to the induction coil to inductively heat the food packaging and thus heat the food product; wherein the electronic control unit is configured to control induction heating of the food product. The electronic control unit may include a plurality of operating programs for heating a corresponding plurality of food products. The electronic control unit may control induction heating of the food product by activating and deactivating the induction coil according to a predetermined pattern. The electronic control unit may use feedback control to control induction heating of the food product. The food packaging may include an RF temperature sensor which transmits temperature information related to the food product to the electronic control unit.

According to another embodiment, a method for heating a food product comprises: packaging a food product using food packaging which includes a current conducting material, the food packaging being no more than approximately 250 mils thick; and heating the food packaging inductively to heat the food product.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., consensus definitions from widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions:

(a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

As used herein, spatial or directional terms, such as "left," "right," "front," "back," and the like, relate to the subject matter as it is shown in the drawing FIGS. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification are understood as modified in all instances by the term "about." At the very least, and not as an attempt to limit the application of the doctrine of equivalents to the claims, each numerical parameter recited in the specification or claims which is modified by the term "about" should at least be construed in light of the number of recited significant digits and by applying ordinary rounding techniques. Moreover, all ranges disclosed herein are to be understood to encompass any and all subranges subsumed therein. For example, a stated range of 1 to 10 should be considered to include any and all subranges between and inclusive of the minimum value of 1 and the maximum value of 10; that is, all subranges beginning with a minimum value of 1 or more and ending with a maximum value of 10 or less (e.g., 5.5 to 10).

What is claimed is:

1. An induction heating system, comprising:
   a first heating surface, the first heating surface having a lower side and an upper side;
   an induction coil located along the lower side and under the first heating surface;
   an RF reader; and
   at least one of a wrapper and a disposable box having a surface configured to contact a food product, wherein the at least one of the wrapper and the disposable box is configured to be placed along the upper side and on top of the first heating surface, the at least one of the wrapper and the disposable box comprising a current conducting material such that the at least one of the wrapper and the disposable box is inductively heated to a temperature sufficient to heat the food product when the induction coil is energized, the at least one of the wrapper and the disposable box further comprising an RF tag configured to provide the RF reader with information relating to the food product.

2. The induction heating system of claim 1, further comprising an electronic control unit including a processor connected to the induction coil and the RF reader, the electronic control unit configured to control the induction coil based on the information relating to the food product.

3. The induction heating system of claim 2, wherein the RF tag is configured to automatically provide the electronic control unit with information.

4. The induction heating system of claim 3, wherein the RF tag provides the electronic control unit with heating instructions for the food product.

5. The induction heating system of claim 3, wherein the RF tag comprises a temperature sensor, wherein the electronic control unit is configured to turn off the induction coil when the RF tag indicates that a preset temperature of the food product is detected.

6. The induction heating system of claim 2, further comprising another induction coil, wherein a first one of the induction coils corresponds to a first zone and a second one of the induction coils corresponds to a second zone, and wherein the processor is configured to evaluate a number of food products positioned within at least one of the first zone and the second zone based on the information from the RF reader.

7. The induction heating system of claim 6, further comprising a second heating surface.

8. The induction heating system of claim 7, wherein the first heating surface corresponds to the first zone and is configured to heat food associated with the at least one of the wrapper and the disposable box at a first temperature and the second heating surface corresponds to the second zone and is configured to heat food associated with a second at least one of a wrapper and a disposable box at a second temperature different than the first temperature, wherein the first and the second induction coils are configured to transmit different amounts of energy based on the information relating to the food products of the first zone and the second zone, respectively.

9. The induction heating system of claim 3, wherein the RF tag provides the electronic control unit with a type of food product configured to be contained within the at least one of the wrapper and the disposable box.

10. An induction heating system, comprising:
   a first heating surface, the first heating surface having a lower side and an upper side;
   an induction coil located along the lower side and under the first heating surface;
   an RF reader; and
   at least one of a wrapper and a disposable box having a surface that contacts a particular food product, wherein the at least one of the wrapper and the disposable box is configured to be placed along the upper side and on top of the first heating surface, the at least one of the wrapper and the disposable box comprising a current conducting material such that the at least one of the wrapper and the disposable box is inductively heated to a temperature sufficient to heat the particular food product when the induction coil is energized, the at least one of the wrapper and the disposable box further comprising an RF tag configured to provide the RF reader with information relating to the particular food product.

11. The induction heating system of claim 4, wherein the RF tag is configured to provide information relating to a heating algorithm for a particular food product the at least one of the wrapper and the disposable box is configured to receive.

12. The induction heating system of claim 11, wherein the heating algorithm includes a pattern of on and off cycles for the induction coil.

* * * * *